(12) United States Patent
Choi et al.

(10) Patent No.: US 10,148,377 B2
(45) Date of Patent: Dec. 4, 2018

(54) SYSTEM AND METHOD OF SELECTIVELY RECEIVING AND TRANSMITTING A PACKET BASED ON PACKET TIME INFORMATION

(71) Applicant: Samsung Electronics Co., Ltd., Suwon-si, Gyeonggi-do (KR)

(72) Inventors: Min-suk Choi, Suwon-si (KR); Woo-jin Park, Yongin-si (KR); Hun-je Yeon, Seoul (KR); Van canh Nguyen, Suwon-si (KR); Islam Mohammad Zuberul, Suwon-si (KR); Won-joo Park, Gwangju-si (KR); Jin-wook Lee, Yongin-si (KR); Jin-guk Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 14/450,487

(22) Filed: Aug. 4, 2014

(65) Prior Publication Data
US 2015/0063092 A1    Mar. 5, 2015

(30) Foreign Application Priority Data
Aug. 30, 2013    (KR) .................. 10-2013-0104391

(51) Int. Cl.
*H04J 3/06* (2006.01)
*H04L 29/06* (2006.01)
*H04L 12/24* (2006.01)

(52) U.S. Cl.
CPC .......... *H04J 3/0602* (2013.01); *H04L 41/064* (2013.01); *H04L 67/38* (2013.01)

(58) Field of Classification Search
CPC ....... H04L 67/38; H04L 41/064; H04J 3/0602
See application file for complete search history.

(56) References Cited

U.S. PATENT DOCUMENTS

| | | | | |
|---|---|---|---|---|
| 5,859,837 A | * | 1/1999 | Crayford | H04L 12/46 370/230 |
| 5,874,951 A | * | 2/1999 | Sakakibara | G06T 11/206 715/201 |
| 6,222,822 B1 | * | 4/2001 | Gerardin | H04L 47/10 370/230 |
| 2007/0263628 A1 | * | 11/2007 | Axelsson | H04L 45/00 370/392 |
| 2012/0203893 A1 | * | 8/2012 | Williams | H04L 69/163 709/224 |
| 2012/0226752 A1 | * | 9/2012 | Jeong | H04L 67/02 709/204 |
| 2013/0117621 A1 | * | 5/2013 | Saraiya | H04L 49/356 714/748 |

(Continued)

FOREIGN PATENT DOCUMENTS

KR    1020140125671 A    10/2014

*Primary Examiner* — Ayaz Sheikh
*Assistant Examiner* — Hai-Chang Hsiung
(74) *Attorney, Agent, or Firm* — Jefferson IP Law, LLP

(57) ABSTRACT

A method of receiving a packet by a receiving terminal is provided. The method includes receiving one or more packets including information about an event which belongs to a same kind of event from a transmitting terminal, and selecting at least one packet from among the received one or more packets based on time information of a certain point of time at the certain point of time.

8 Claims, 9 Drawing Sheets

(56) References Cited

U.S. PATENT DOCUMENTS

| | | | |
|---|---|---|---|
| 2013/0182668 A1* | 7/2013 | Xu | H04W 74/0833 370/329 |
| 2013/0246576 A1* | 9/2013 | Wogsberg | H04N 7/181 709/219 |
| 2014/0317530 A1 | 10/2014 | Chang et al. | |

* cited by examiner

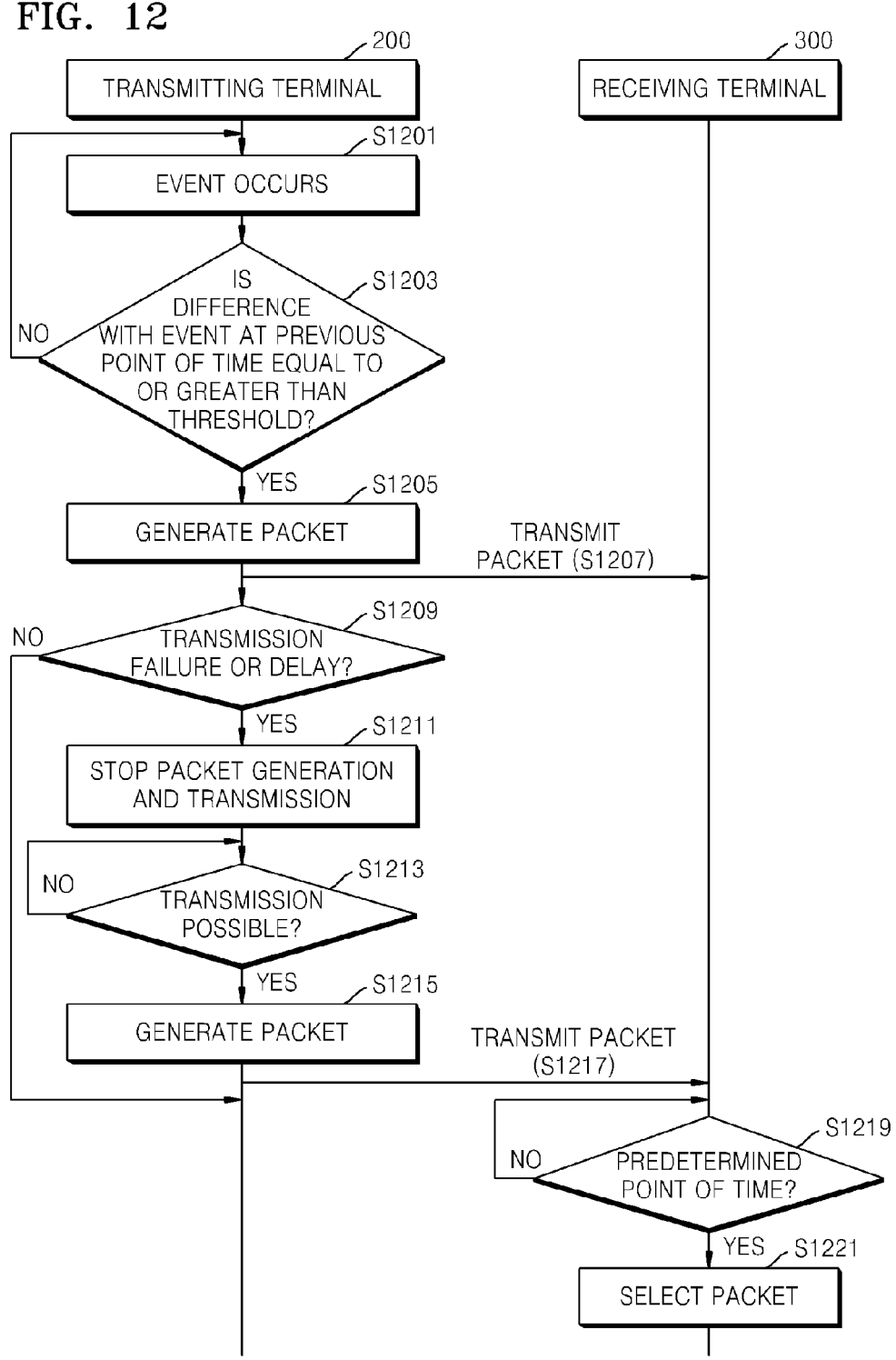

SYSTEM AND METHOD OF SELECTIVELY RECEIVING AND TRANSMITTING A PACKET BASED ON PACKET TIME INFORMATION

CROSS-REFERENCE TO RELATED APPLICATION(S)

This application claims the benefit under 35 U.S.C. § 119(a) of a Korean patent application filed on Aug. 30, 2013 in the Korean Intellectual Property Office and assigned Serial number 10-2013-0104391, the entire disclosure of which is hereby incorporated by reference.

TECHNICAL FIELD

The present disclosure relates to a method of transmitting and receiving a packet, a terminal thereof, and a system thereof. More particularly, the present disclosure relates to a method of transmitting and receiving a packet between a plurality of terminals, a terminal thereof, and a system thereof.

BACKGROUND

With the development of a wired or wireless communication network, electronic devices for outputting data, which may be visually recognized by a user by displaying a screen, may be mutually connected through a wired or wireless communication network.

Various data may be transmitted or received through a wired or wireless communication network, and one electronic device may remotely control another electronic device, or one electronic device may be used through another electronic device.

When a receiving terminal receives and displays data in real time according to the environment of the wired or wireless communication network through which data is transmitted or received, there is a need for a method and apparatus for effectively processing and displaying the data.

Furthermore, when the transmitting terminal generates and transmits data in real time according to the environment of the wired or wireless communication network through which data is transmitted or received, there is a need for a method and apparatus for effectively transmitting data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of transmitting or receiving a packet containing information for synchronizing an event which is generated in another terminal.

Additional aspects will be set forth in part in the description which follows and, in part, will be apparent from the description, or may be learned by practice of the presented various embodiments.

In accordance with an aspect of the present disclosure, a method of receiving a packet by a receiving terminal is provided. The method includes receiving one or more packets including information about an event which belongs to a same kind of event from a transmitting terminal, and selecting at least one packet from among the received one or more packets based on time information of a certain point of time at the certain point of time.

The method may further include synchronizing the event by using the selected packet, in which the event may be dependent on time.

The method may further include selecting a most recently received packet or selecting a packet including information about a most recently occurred event based on the certain point of time.

In accordance with another aspect of the present disclosure, a method of transmitting a packet by a transmitting terminal is provided. The method includes generating one or more packets including information about an event which belongs to a same kind of event, and transmitting the generated one or more packets to a receiving terminal, in which the packet may be selected based on time information of a certain point of time at the certain point of time.

The packet may be selected based on whether the packet is most recently received based on the certain point of time or includes information about a most recently occurred event at the certain point of time.

The transmitting of the generated one or more packets to the receiving terminal may include stopping transmission of the packet if it is detected that transmission of the packet fails or is delayed for more than a certain amount of time, detecting whether the transmission of the packet is possible, and transmitting a packet corresponding to the current point of time to the receiving terminal if it is detected that the transmission of the packet is possible.

The generating of the one or more packets may include determining whether there is a difference between information about the event at a first point of time and information about the event at a second point of time, and generating one or more packets including information about the event at the first point of time according to a result of the determination.

The event may be dependent on time and the packet may include data for synchronizing the event in the receiving terminal.

In an accordance with another aspect of the present disclosure, a receiving terminal is provided. The receiving terminal includes a communication unit configured to receive one or more packets including information about an event which belongs to a same kind of event from a transmitting terminal, and a controller configured to select at least one packet from among the received one or more packets based on time information of a certain point of time at the certain point of time.

In an accordance with another aspect of the present disclosure, a transmitting terminal is provided. The transmitting terminal includes a controller configured to generate one or more packets including information about an event which belongs to a same kind of event, and a communication unit configured to transmit the generated one or more packets to a receiving terminal, wherein the packet is selected based on time information of a certain point of time at the certain point of time.

In an accordance with another aspect of the present disclosure, a system is provided. The system includes a transmitting terminal configured to generate one or more packets including information about an event which belongs to a same kind of event and to transmit the generated one or more packets to a receiving terminal, and the receiving terminal configured to receive the generated one or more packets from the transmitting terminal and to select one or more packets from among the received one or more packets based on time information of a certain point of time at the certain point of time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which:

FIG. 12 is a flowchart illustrating a method of transmitting or receiving a packet according to an embodiment of the present disclosure.

Throughout the drawings, it should be noted that like reference numbers are used to depict the same or similar elements, features, and structures

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
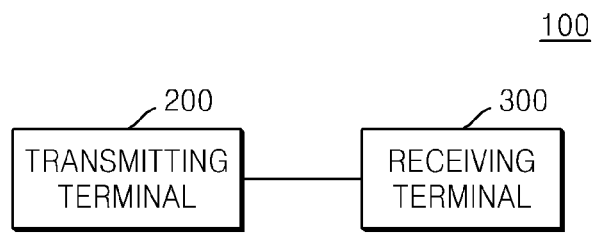
FIG. 1 is a block diagram illustrating a system that performs a method of transmitting and receiving a packet according to an embodiment of the present disclosure.

FIG. 1 is a block diagram illustrating a system that performs a method of transmitting and receiving a packet according to an embodiment of the present disclosure.

Referring to FIG. 1, a system 100, which performs a method of transmitting or receiving a packet according to an embodiment of the present disclosure, includes a transmitting terminal 200 that transmits a packet and a receiving terminal 300 that receives a transmitted packet.

The transmitting terminal 200 and the receiving terminal 300 may be various forms of devices which display a certain screen and are used by a user. For example, the transmitting terminal 200 and the receiving terminal 300 may be one of a mobile phone, a smart phone, a notebook computer, a terminal for receiving or transmitting a digital broadcast, a Personal Digital Assistant (PDA), a Portable Multimedia Player (PMP), a navigation, a tablet Personal Computer (PC), a smart TV, and a beam projector. These are merely examples, and may be understood as a concept including devices which have already been developed and commercialized or devices to be developed in the future.

The transmitting terminal 200 and the receiving terminal 300 may transmit or receive data through a wired or wireless network. In an embodiment of the present disclosure, the transmitting terminal 200 may generate a packet including information about an event which has occurred in the transmitting terminal 200, and transmit the generated packet to the receiving terminal 300 through a wired or wireless network. The network may include one or more various types of known networks, such as an Internet Protocol (IP) network, that provides a seamless data service, an All IP network which has integrated different networks based on the IP, a Wireless broadband (Wibro) network, a wireless Local Area Network (LAN), a Wireless Personal Area Network (WPAN), a Wireless Metropolitan Area Network (WMAN), a wired communication network, a mobile communication network, a High Speed Downlink Packet Access (HSDPA) network, a short distance wireless communication network, and a satellite communication network, and may further include a next generation communication network to be developed in the future.

The mobile communication network may include one of first to fifth generation mobile communication networks. The wired communication network may include one of a High-Definition Multimedia Interface (HDMI) that involves a scheme connected via a wired interface, IEEE1394, a serial port, a parallel port, and a Universal Serial Bus (USB). The short distance wireless communication network may include one of Bluetooth, Zigbee, Radio Frequency IDentification (RFID), Infrared Data Association (IrDA), and Ultra WideBand (UWB).

The communication schemes, which may be included in the above-described network, are merely examples, and may be understood as a concept including communication schemes which have been already developed and commercialized or communication schemes to be developed in the future.

In an embodiment of the present disclosure, the transmitting terminal 200 may generate at least one packet including information about an event which has occurred in the transmitting terminal 200, and transmit the generated packet to the receiving terminal 300. Furthermore, the receiving terminal 300, which has received the packet from the transmitting terminal 200, may select at least one packet from among packets which have been received based on the time information at a certain point of time.

For example, the most recently received packet may be selected based on the certain point of time. The most recently received packet may include information about the most recently occurred event, and thus the receiving terminal 300 may synchronize the event of the receiving terminal 300 with the event which has occurred in the transmitting terminal 200 using the most recently received packet.

However, the packets may be selected by using various methods based on a certain point of time. For example, packets may be selected according to whether the point of time of occurrence of an event included in the packet is most recent based on a certain point of time. When the speeds transmitted to the receiving terminal 300 differ depending on the packet, the packet including information about the most recently occurred event may be received earlier than the packet including information about the previously occurred event, and the packet including information about the previously occurred event may become the last one to be received. Hence, the packet including information about the most recently occurred event based on a certain point of time may be selected for event synchronization.

According to an embodiment of the present disclosure, the receiving terminal 300 may select the most recently received packet or a packet including information about the most recently occurred event. Furthermore, the receiving terminal 300 may synchronize the event of the receiving terminal 300 with the event which has occurred in the transmitting terminal 200 using information about the event included in the packet selected in the transmitting terminal 200.

In an embodiment of the present disclosure, synchronizing the event of the receiving terminal 300 may refer to changing the status information of the event of the receiving terminal 300 based on the status information of the event of the transmitting terminal 200.

For example, when the event is an event that occurs due to movement of a mouse pointer, the position of the mouse pointer of the receiving terminal 300 may be changed to be the same as the position of the mouse pointer of the transmitting terminal 200. The receiving terminal 300 may display the mouse pointer on the screen of the receiving terminal 300 based on the changed position of the mouse pointer. In other words, the receiving terminal 300 may display the moving mouse pointer on the screen as the same movement as that of the mouse pointer of the transmitting terminal 200.

In addition, the position of the mouse pointer of the receiving terminal 300 may be changed according to an input received in the transmitting terminal 200. For example, the position of the mouse pointer of the receiving terminal 300 may be changed according to the input received in the input device connected with the transmitting terminal 200.

The mouse pointer displayed on the receiving terminal 300 may be displayed in the receiving terminal 300 as well as in the transmitting terminal 200 as the packet received from the transmitting terminal 200 is processed according to an embodiment of the present disclosure.

When the event is synchronized by processing the received packet whenever the packet including information about the event that occurred in the transmitting terminal 200 is received, if the speed at which each packet is transmitted or received decreases, it may be difficult to synchronize the most recently occurred event information. Hence, according to an embodiment of the present disclosure, at least one packet including information about the event that occurred in the transmitting terminal 200 may be transmitted to the receiving terminal 300. Furthermore, the event of the receiving terminal 300 may be synchronized with the event of the transmitting terminal 200 by using information about the event which most recently occurred based on a certain point of time.

In an embodiment of the present disclosure, a certain point of time may be arbitrarily determined, and the point of time may be repeatedly determined according to the flow of time. Hence, the receiving terminal 300 according to an embodiment of the present disclosure may synchronize an event by selecting a packet including information about the most recently occurred event based on respectively determined points of time. For example, the certain point of time may include a point of time when synchronization of the event starts and a point of time which may be repeatedly determined according to the period T from the point of time. The period T may be a user's input or a set value.

The certain point of time may be repeatedly determined according to the set value T, but may also include a point of time which is randomly set depending on the situation. For example, when the packet transmission becomes possible after the packet transmission is stopped according to the network environment state, a point of time after a certain time may be determined again based on the point of time when the packet transmission has become possible.

In an embodiment of the present disclosure, when the transmitting terminal 200 transmits a packet so that the event of the receiving terminal 300 is synchronized with the event generated in the transmitting terminal 200, the transmitted packet may be received after a significant amount of time passes from the point of time when the event has occurred. If the event of the receiving terminal 300 is synchronized to the packet received after a significant amount of time passes after the point of time when the event occurs in the transmitting terminal 200, there may be a temporal interval between the event that occurred in the transmitting terminal 200 and the event synchronized in the receiving terminal 300. For example, the event in the receiving terminal 300 may be synchronized later than the point of time when the event has occurred in the transmitting terminal 200.

If the synchronization of the event is delayed, when the synchronized event is displayed on the screen of the receiving terminal 300, even if an event occurs in the transmitting terminal 200, the event, which is displayed on the screen of the receiving terminal 300 may be displayed after being synchronized later than the point of time when the event has occurred. For example, the result of event synchronization may be displayed later than the point of time of event occurrence. When real time event synchronization is important, it is not appropriate for the event synchronization result to be displayed later than the point of time of event occurrence.

Hence, according to an embodiment of the present disclosure, the receiving terminal 300 may select packets including a recently received packet or a recently occurred event based on a certain point of time, and synchronize the event based on the data included in the selected packets. The receiving terminal 300 may minimize the case where synchronization is performed later than the point of time of event occurrence by selecting a packet including a recently received packet or a recently occurred event from among packets received for a certain amount of time based on a certain point of time instead of synchronizing the event when the packet is received.

When the network, in which the packets are transmitted and received, is a wired network, the possibility of interference from an external environment is low, and thus there is a low possibility that the data transmission and reception speed of the network is changed due to interference from the external environment. However, when such a network is a wireless network, there is a high possibility that the data transmission and reception speed of the network may be changed by interference from the external environment. Hence, when the transmitting terminal 200 and the receiving terminal 300 transmit and receive packets through a wireless network, there is a high chance that the packet transmission is delayed or fails. Hence, if the receiving terminal 300 synchronizes the event whenever the packet is received, there may be a difference between the point of time of event occurrence in the transmitting terminal 200 and the point of time when the event is synchronized in the receiving terminal 300.

For example, when an event, whose real time attribute is important, is synchronized, if a packet is received after a significant amount of time, the real time attribute of the synchronized event may not be guaranteed. In an embodiment of the present disclosure, the event, whose real time attribute is important, may include the movement of the mouse pointer and the screen display of the transmitting terminal 200 in the receiving terminal 300.

For example, the movement of the mouse pointer may refer to controlling the movement of the mouse pointer according to a received input and receiving and processing the result so as to be displayed. For example, the movement of the mouse pointer may include a case where the user performs an input using the transmitting terminal 200 and the performed input is displayed in the receiving terminal 300. At this time, a result of the input may be displayed in the transmitting terminal 200 for convenience.

In the case of movement of the mouse pointer, the currently input result may be promptly displayed in the transmitting terminal 200 as a priority, and the later display of the input result at the previous point of time may not be important. Hence, processing and displaying the most recently input result based on the current point of time may be more appropriate than processing and displaying the previously input result.

Hence, according to an embodiment of the present disclosure, an input event for the movement of the mouse pointer which is repeatedly generated in the transmitting terminal 200 may be transmitted to the receiving terminal 300. Furthermore, the receiving terminal 300 may process a recently generated input event based on the point of time when the input event is processed, and display a result of the processing on the screen. At this time, the current point of time may correspond to the above described point of time. Processing of the recently generated input event and displaying the result of the processing in the receiving terminal 300 may correspond to synchronizing the event generated in the transmitting terminal 200.

In addition, the screen display of the transmitting terminal 200 may refer to displaying the screen, which is displayed on the transmitting terminal 200, on the screen of the receiving terminal 300 in the same manner. At this time, the screen displayed on the transmitting terminal 200 and the screen displayed on the receiving terminal 300 may be displayed in the same manner at the same point of time for user convenience.

When the screen of the transmitting terminal 200 is displayed on the receiving terminal 300, the currently displayed screen of the transmitting terminal 200 may be simultaneously displayed in the receiving terminal 300 with a higher priority than displaying the screen at the previous point of time. Hence, the most recently displayed screen of the transmitting terminal 200 may be processed and displayed with a higher priority than processing and displaying the screen of the transmitting terminal 200 which is displayed at the previous point of time.

Hence, according to an embodiment of the present disclosure, the screen event, which is repeatedly displayed in the transmitting terminal 200, may be transmitted to the receiving terminal 300. Hence, the receiving terminal 300 may process and display the recently displayed screen of the transmitting terminal 200 based on the point of time when the screen of the transmitting terminal 200 is processed in the receiving terminal 300. At this time, the current point of time may correspond to the above described point of time. Furthermore, receiving and displaying of the recently displayed screen of the transmitting terminal 200 by the receiving terminal 300 may correspond to synchronizing the above-described event generated in the transmitting terminal 200.

In an embodiment of the present disclosure, the event, which may be generated in the transmitting terminal 200, may be dependent on time. For example, the event, which may occur in the transmitting terminal 200, may include an event, of which value may be changed according to time, such as the movement of the mouse pointer or the screen display of the transmitting terminal 200. More specifically, the movement of the mouse pointer or the screen display of the transmitting terminal 200 may be an event dependent on time because the movement or the content displayed on the screen is changed according to time.

At this time, in an embodiment of the present disclosure, information about the event included in each packet, which may be selected according to time information at a certain point of time, may be information for the same kind of event. For example, when the event for the movement of the mouse pointer is synchronized in the receiving terminal 300, selection may be made from among the packets including the movement event information for the same mouse pointer. For example, the receiving terminal 300 may select a packet for performing event synchronization from among packets for the mouse pointer movement event having the same mouse pointer shape or controlled by the same terminal or the same input device.

Referring to FIG. 1, one receiving terminal 300 is connected to the transmitting terminal 200, but the embodiment is not limited thereto, and a plurality of receiving terminals may be connected to the transmitting terminal 200. For example, a plurality of receiving terminals may receive packets including information about the event and synchronize the event by using the received packet. The packet, which is received in each receiving terminal, may be a packet including the same information or a packet including the information about another event, depending on the embodiment.

The internal structure of the above-described transmitting terminal 200 and the receiving terminal 300 will be described below with reference to FIGS. 2 and 3.

Figure 2:
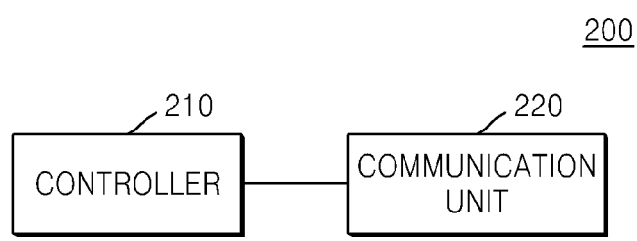
FIG. 2 is a block diagram illustrating an internal structure of a transmitting terminal according to an embodiment of the present disclosure.

FIG. 2 is a block diagram illustrating an internal structure of a transmitting terminal according to an embodiment of the present disclosure.

Referring to FIG. 2, the transmitting terminal 200 may include a controller 210 and a communication unit 220. However, some of the components illustrated in FIG. 2 may not be essential components. More or less components may be used to implement the transmitting terminal 200.

The controller 210 may generally control overall operation of the transmitting terminal 200. For example, the controller 210 may generate a packet including information which has occurred in the transmitting terminal 200, and may control the communication unit 220 to transmit the generated packet to the receiving terminal 300. For example, the controller 210 may control the communication unit 220 in an overall sense.

In an embodiment of the present disclosure, the controller 210 may generate at least one packet including information about the event which belongs to the same kind of event. At this time, the packet may be selected according to whether the packet has been most recently selected by the receiving terminal 300 based on a certain point of time or whether the packet includes information about the most recently occurred event. The selected packet may be used to synchronize the event in the receiving terminal 300.

The communication unit 220 may include one or more components which allow communication between the transmitting terminal 200 and one or more receiving terminals 300. For example, the communication unit 220 may include one or more components which allow communication between the transmitting terminal 200 and one or more receiving terminals 300. For example, the communication unit 220 may include a mobile communication module, a wireless Internet module, a wired Internet module, and a short distance communication module.

The mobile communication module transmits or receives wireless signals to or from at least one of a base station, an external terminal, and a server in the mobile communication network. Here, the wireless signal may include various forms of data according to the transmission and reception of a text/multimedia message, a voice call signal, or a video call signal.

The wireless Internet module is a module for wireless Internet connection, and the wireless Internet module may be internally or externally mounted. Furthermore, the wired Internet module refers to a module for wired Internet connection.

The short distance communication module refers to a module for short distance communication. Some examples of the short distance communication are Bluetooth, RFID, IrDA, UWB, ZigBee, Wi-Fi Direct (WFD), and Near Field Communication (NFC).

In an embodiment of the present disclosure, the communication unit 220 may transmit at least one packet, which is generated by the controller 210, to one or more receiving terminals 300 through a certain network.

Figure 3:
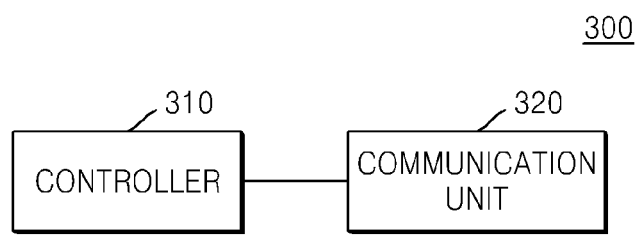
FIG. 3 is a block diagram illustrating an internal structure of a receiving terminal according to an embodiment of the present disclosure.

FIG. 3 is a block diagram illustrating an internal structure of a receiving terminal according to an embodiment of the present disclosure.

Referring to FIG. 3, the receiving terminal 300 may include a controller 310 and a communication unit 320.

However, some of the components illustrated in FIG. 3 may not be essential. More or less components may be used to implement the receiving terminal 300.

The controller 310 may generally control overall operation of the receiving terminal 300. For example, the communication unit 320 may be controlled to receive at least one packet including information about the event which belongs to the same kind of event from the transmitting terminal 200. For example, the controller 310 may control overall operation of the communication unit 320.

In an embodiment of the present disclosure, the controller 310 may select a most recently received packet or a packet which includes information about the most recently occurred event in order to synchronize the event in the receiving terminal 300.

The communication unit 320 may include one or more components which allow communication between the transmitting terminal 200 and the receiving terminal 300. For example, the communication unit 320 may include a mobile communication module, a wireless Internet module, a wired Internet module, and a short distance communication module.

The mobile communication module transmits or receives wireless signals to or from at least one of a base station, an external terminal, and a server in the mobile communication network. Here, the wireless signal may include various forms of data according to the transmission and reception of a text/multimedia message, a voice call signal, or a video call signal.

The wireless Internet module is a module for wireless Internet connection, and the wireless Internet module may be internally or externally mounted. Furthermore, the wired Internet module refers to a module for wired Internet connection.

The short distance communication module refers to a module for short distance communication. Some examples of the short distance communication are Bluetooth, RFID, IrDA, UWB, ZigBee, WFD, and NFC.

In an embodiment of the present disclosure, the communication unit 320 may receive at least one packet including information about the event which belongs to the same kind of event from the transmitting terminal 200.

FIGS. 4A, 4B, 4C, and 4D illustrate an event displayed using a received packet according to an embodiment of the present disclosure. Hereinafter, the event of FIGS. 4A to 4D is described based on a movement event of a mouse pointer, but the embodiment is not limited thereto, and other events may also be included.

Figure 4A:
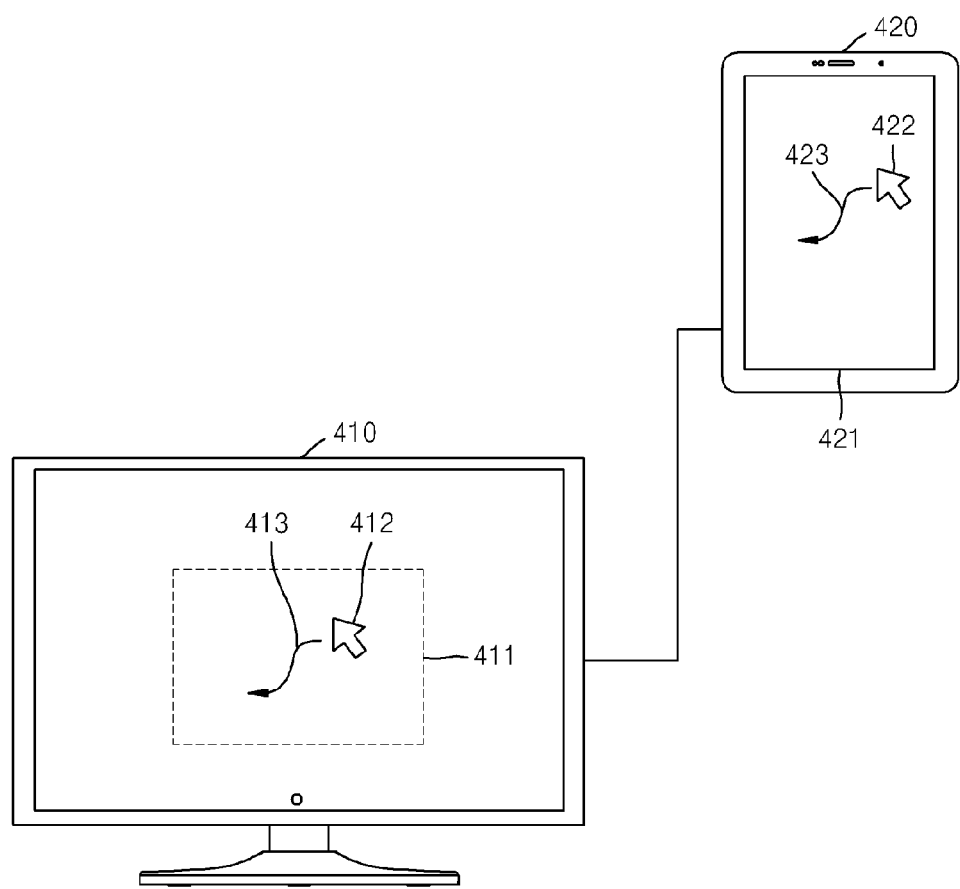
FIGS. 4A, 4B, 4C, and 4D illustrate an event displayed using a received packet according to an embodiment of the present disclosure.

Referring to FIG. 4A, a transmitting terminal 410 and a receiving terminal 420 may be connected by a wired or wireless network. The transmitting terminal 410 of FIG. 4A may be a terminal having a display screen, such as a smart TV, PC monitor, and the like. For example, the transmitting terminal 410 may display an input, which is received through an input device, such as a mouse, a remote controller, and the like, connected to the transmitting terminal 410, on a display screen area 411. The receiving terminal 420 of FIG. 4A may be a terminal including a display screen.

According to the input received in the transmitting terminal 410, the mouse pointer may be moved in a location 412 in the display screen area 411 of the transmitting terminal 410 along a path 413. Furthermore, the receiving terminal 420 may move the mouse pointer in a location 422 along a path 423 by using event information received from the transmitting terminal 410. The location 412 and the path 413 may respectively correspond to the location 422 and the path 423. At this time, the packet, which may be received in the receiving terminal 420 may contain information about the location of the mouse pointer which is changed according to time. The receiving terminal 420 may select the packet including the most recent location information at the point of time when the packet is processed so as to be displayed on the screen 421 of the receiving terminal 420. As the interval at the point of time when the packet is processed gets shorter in the receiving terminal 420, the movement of the mouse pointer may be more naturally displayed.

Figure 4B:
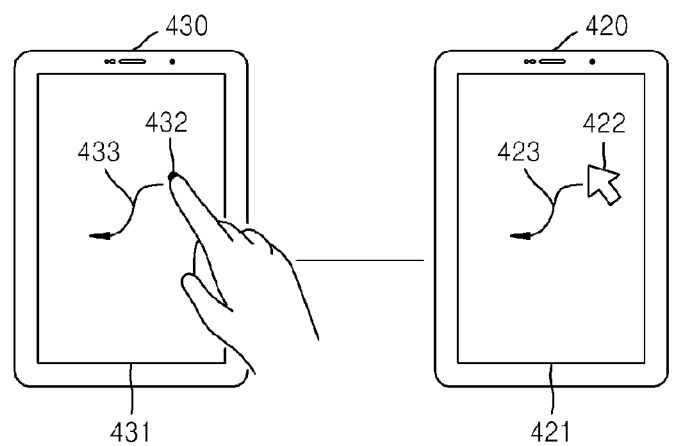

Referring to FIG. 4B, a transmitting terminal 430 and the receiving terminal 420 may be connected by a wired or wireless network. The transmitting terminal 430 illustrated in FIG. 4B may be a terminal including a touch screen, such as a tablet PC, a smart phone, and the like. For example, the transmitting terminal 430 may display an input on the touch screen like the input from a mouse pad on the display screen area 431. The receiving terminal 420 illustrated in FIG. 4B may be a terminal which corresponds to the receiving terminal 420 of FIG. 4A and includes a display screen. The transmitting terminal 430 and the receiving terminal 420 of FIG. 4B correspond to the transmitting terminal 410 and the receiving terminal 420 of FIG. 4A, and overlapping descriptions will be omitted here.

As the input received in the transmitting terminal 430 is moved in a location 432 along a path 433, the receiving terminal 420 may move the mouse pointer in the location 422 along the path 423. The location 432 and the path 433 may respectively correspond to the location 422 and the path 423. At this time, the input received in the transmitting terminal 430 may not be displayed in the display screen area 431 of the transmitting terminal 430 as the mouse pointer is displayed in the receiving terminal 420.

Figure 4C:
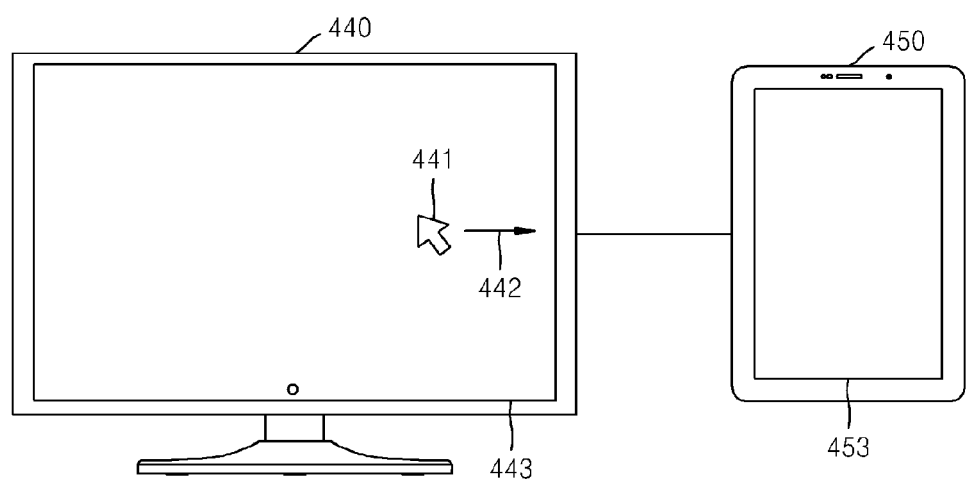
Figure 4D:
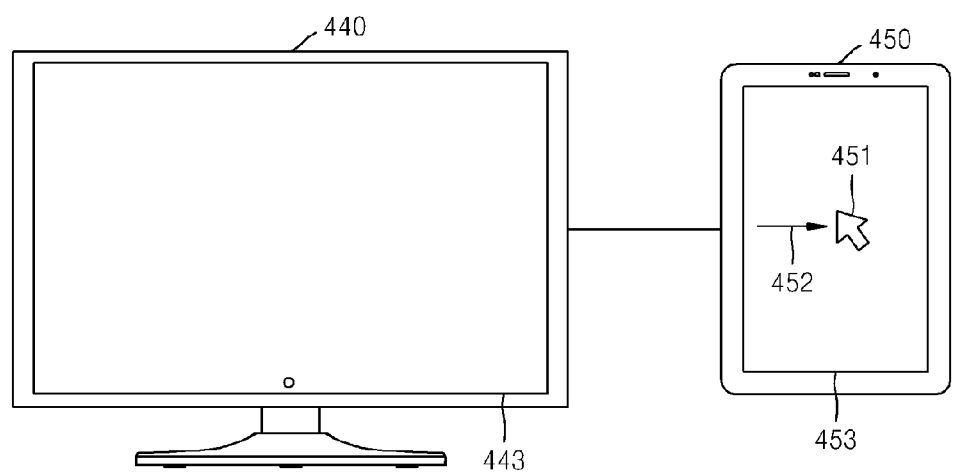

Referring to FIGS. 4C and 4D, a transmitting terminal 440 and a receiving terminal 450 may be connected by a wireless and wired network. The transmitting terminal 440 and the receiving terminal 450 of FIGS. 4C and 4D correspond to the transmitting terminal 410 and the receiving terminal 420 of FIG. 4A, and overlapping descriptions will be omitted here.

According to the input received in the transmitting terminal 440, the mouse pointer may be moved in the location 441 in the display screen area 443 of the transmitting terminal 440 along the path 442. If the mouse pointer reaches the boundary of the display screen area 443 while moving along the path 442, the movement of the mouse pointer thereafter may be displayed in the display screen area 453 of the receiving terminal 450.

In other words, if the movement of the mouse pointer goes over the boundary of the display screen area 443 of the transmitting terminal 440, the movement of the mouse pointer may be displayed in the display screen area 453 of the receiving terminal 450. For example, if the movement of the mouse pointer goes over the boundaries which are located at the upper side, the lower side, the left side, and the right side of the display screen area 443 of the transmitting terminal 440, the mouse pointer may appear at the boundaries of the lower side, the upper side, the right side, and the left side of the display screen area 453 of the receiving terminal, respectively.

The mouse pointer, which moves beyond the boundary of the display screen area 443 of the transmitting terminal 440, may move to the location 451 along the path 452 in the display screen area 453 of the receiving terminal 450. At this time, the receiving terminal 450 may receive a packet for moving the mouse pointer within the display screen area 453 from the transmitting terminal 440.

The packet, which may be received in the receiving terminal 450, may include information about the location of the mouse pointer which is changed according to time. The information about the location of the mouse pointer may include at least one of the movement direction and movement distance of the mouse pointer among the input information which may be received in the transmitting terminal 440. For example, the receiving terminal 450 may select a packet including the most recent location information of the mouse pointer at the point of time when the packet is processed.

When the network between the transmitting terminal 440 and the receiving terminal 450 is a wireless network, there is a high possibility that interference occurs from an external environment, and thus the transmission speed of the packet is not fixed, and there is a high possibility that the packet transmission is delayed or fails. Hence, according to an embodiment of the present disclosure, the receiving terminal 450 may select a packet, which is most recently received based on a certain point of time or includes location information of the mouse pointer at the most recent point of time, from among one or more packets which are received for a certain period of time. However, the above-described packet transmission and reception method is not limited to the case where the network between the transmitting terminal 440 and the receiving terminal 450 is a wireless network, but the method may also be applied when the network is a wired network.

The receiving terminal 450 may process the packet according to whether the packet has been recently received or includes location information of the mouse pointer at a recent point of time based on a certain point of time instead of moving the mouse pointer by processing the received packet whenever the packet is received. Hence, the receiving terminal 450 may stably and seamlessly display the movement of the mouse pointer even in a wireless network environment where the transmission speed of the packet is not fixed.

Furthermore, the receiving terminal 450 may move the mouse pointer according to the selected packet, and display a result of the movement in the screen of the receiving terminal 450. As the interval at the point of time when the packet is processed in the receiving terminal 420 gets shorter, the movement of the mouse pointer may be seamlessly and naturally displayed.

Hence, according to an embodiment of the present disclosure, the mouse pointer, which may be moved according to the input received in the transmitting terminal 440, may be displayed on the display screen area 453 of the receiving terminal 450 as well as the display screen area 443 of the transmitting terminal 440. Furthermore, the mouse pointer, which is displayed on the display screen area 453 of the receiving terminal 450, may be moved within the display screen area of the receiving terminal according to the packet including location information of the mouse pointer which is received from the transmitting terminal.

In other words, the receiving terminal 450 may receive a packet including input information received in the transmitting terminal 440, and move the mouse pointer in the display screen area 453 of the receiving terminal 450 based on the packet selected from one or more packets. In addition, a job may be performed in the receiving terminal 450 according to the input received in the transmitting terminal 440 by a mouse pointer which is displayed in the display screen area 453 of the receiving terminal 450. Hence, the user may perform an input in the receiving terminal 450 using an input device which is connected with the transmitting terminal 440.

Figure 5:
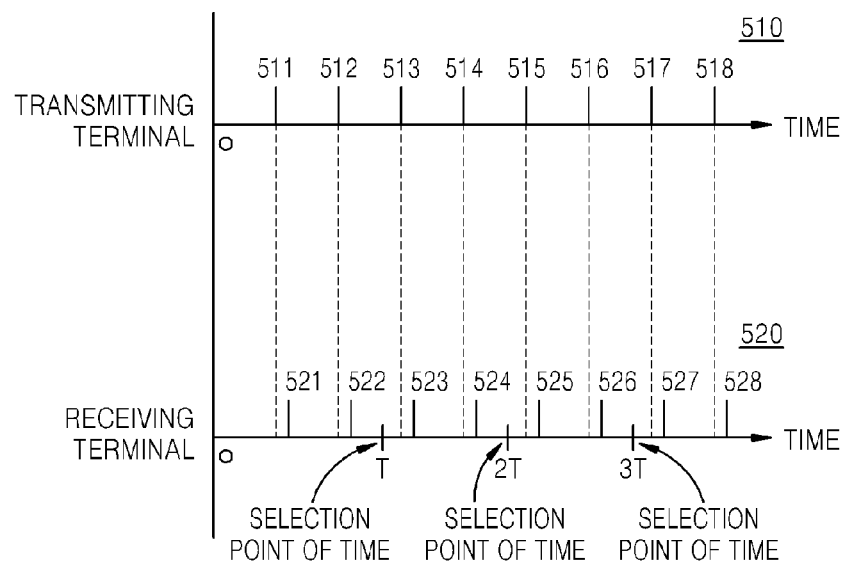
FIG. 5 is a time table illustrating a method of receiving a packet according to an embodiment of the present disclosure.

FIG. 5 is a time table illustrating a method of receiving a packet according to an embodiment of the present disclosure.

Referring to FIG. 5, the time tables 510 and 520, which illustrates an example of a method of receiving a packet according to an embodiment of the present disclosure, may include time tables which display a point of time when a packet is transmitted in the transmitting terminal 200 and a point of time when a packet is received in the receiving terminal 300.

The transmitting terminal 200 may generate a packet including information about the event which occurs according to the time flow in the transmitting terminal, and may transmit the generated packet to the receiving terminal 300. Each packet may be transmitted to the receiving terminal 300 right after the packet is generated so that the event may be synchronized in the receiving terminal 300.

The receiving terminal 300 may synchronize the event by using the packets 511 to 518 transmitted from the transmitting terminal 200, and the times when the packets are received may differ depending on the environment of the network where the packets are transmitted or received. Referring to FIG. 5, the receiving time of each of the packets 521 to 528 received in the receiving terminal 300, that is, the difference between the point of time when each packet is received and the point of time when each packet is transmitted may vary according to the network environment when the packet is transmitted.

According to an embodiment of the present disclosure, the receiving terminal 300 may select the most recently received packet or the packet including information about the most recently occurred event from among packets received for the time interval of each point of time at certain points of time T, 2T, and 3T (at T, between 0 and T, at 2T, between T and 2T, at 3T, between 2T and 3T). The certain points of time T, 2T, and 3T may correspond to the certain points of time described in the explanation on FIG. 1.

The packet 515 transmitted by the transmitting terminal 200 may correspond to the packet 525 received in the receiving terminal 300. At the selection point of time 2T, the packet 515 may be in a state under transmission after generation by the transmitting terminal 200, or the packet transmission may be delayed due to the change of the network environment. When the point of time when the packet is received due to the transmission delay is after 2T, the receiving terminal 300 may select the most recently received packet 524 at 2T. The receiving terminal 300 may synchronize the event by using the selected packet 524.

Hence, according to an embodiment of the present disclosure, even when the packet transmission is delayed, the receiving terminal may select a packet which is recently received or a packet including information about a recently occurred event, from among packets received based on a certain point of time. Hence, the event synchronization may not be delayed by the network transmission speed, and an event may be synchronized at each point of time.

In an embodiment of the present disclosure, period T may be as short a time as necessary for the change of the synchronized event displayed in the receiving terminal 300 to be naturally visible to human eyes. However, the present embodiment is not limited thereto, and the period T may be set to various values depending on the network environment. For example, when the network speed is low, the period T may be a relatively long time.

In addition, when the synchronized event is displayed on the screen of the receiving terminal 300, the difference between the point of time of event occurrence included in the selected packet and the point of time when the synchronized event is displayed may be equal to or greater than a certain time. At this time, when a synchronized event is displayed at the next point of time, the difference between the value of the event synchronized at the next point of time and the value of the event synchronized at the previous point of time may become significant, and thus it may be difficult for human eyes to recognize the event. In this case, the receiving terminal 300 may determine whether the difference between the value of the event synchronized at the next point of time and the value of the event synchronized at the previous point of time is greater than a threshold. Furthermore, the receiving terminal 300 may display the event in a manner that is natural to human eyes by displaying the synchronized event which is changed gradually during the interval of a certain time when the difference is equal to or greater than the threshold.

For example, when the synchronized event is a mouse pointer, the receiving terminal 300 may determine whether the difference between the location of the mouse pointer synchronized at the next point of time and the location of the mouse pointer synchronized at the previous determined point of time is equal to or greater than a threshold. Furthermore, when the difference is equal to or greater than the threshold, the receiving terminal may display the movement of the mouse pointer in a manner that is natural to human eyes by displaying the movement of the mouse pointer gradually during the interval of a certain time when the difference is equal to or greater than the threshold.

Furthermore, in an embodiment of the present disclosure, the transmitting terminal 200 may generate packets at a time interval shorter than the period T so that one or more packets may be selected from one or more packets received during the period T, and the generated packets may be repeatedly transmitted.

For example, the packet, which may be generated in the transmitting terminal 200, may include the data of a minimum size by which the event may be synchronized so that packets may be generated and transmitted at short time intervals. For example, when the event, which may be synchronized, is a mouse pointer event, the packet including the difference between the event information of the packet generated at the previous point of time and the event information at the current point of time may be generated. At this time, the difference value may have a very small value equivalent to the time interval between events that occurred at short time intervals, and thus the size of each packet data set including the difference may also become small.

Figure 6:
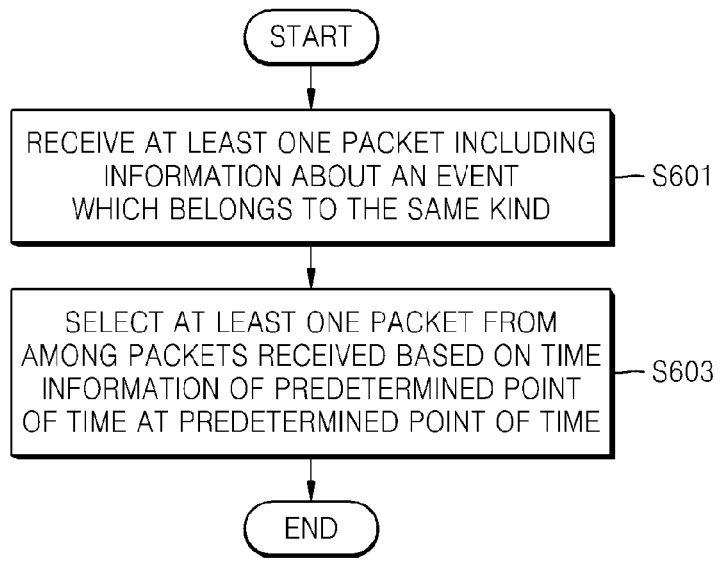
FIGS. 6 and 7 are flowcharts illustrating a method of receiving a packet in a receiving terminal according to an embodiment of the present disclosure.

FIG. 6 is a flowchart illustrating a method of receiving a packet in a receiving terminal according to an embodiment of the present disclosure.

Referring to FIG. 6, in operation S601, the receiving terminal 300 may receive at least one packet including information about an event which belongs to the same kind of event. The packet, which may be received in the receiving terminal 300, may include data of the minimum size from among transmission units which may be transmitted through the network.

In an embodiment of the present disclosure, the packet may include data including the type of an event, a version, the length of the packet data, information about the event, i.e., information for synchronizing the event. For example, when the event is the mouse pointer movement, the packet may include the type and version information of the mouse pointer, the length of the data included in the packet, and the location information of the mouse pointer. Furthermore, the packet may further include information about the time when the event has occurred, i.e., information about the mouse pointer movement point of time.

In operation S603, the receiving terminal 300 may select may select at least one packet from among packets received in operation S601 based on time information of a certain point of time at the certain point of time. According to an embodiment of the present disclosure, the receiving terminal 300 may select a packet which is recently received based on a certain point of time or a packet including information about a recently occurred event.

Figure 7:
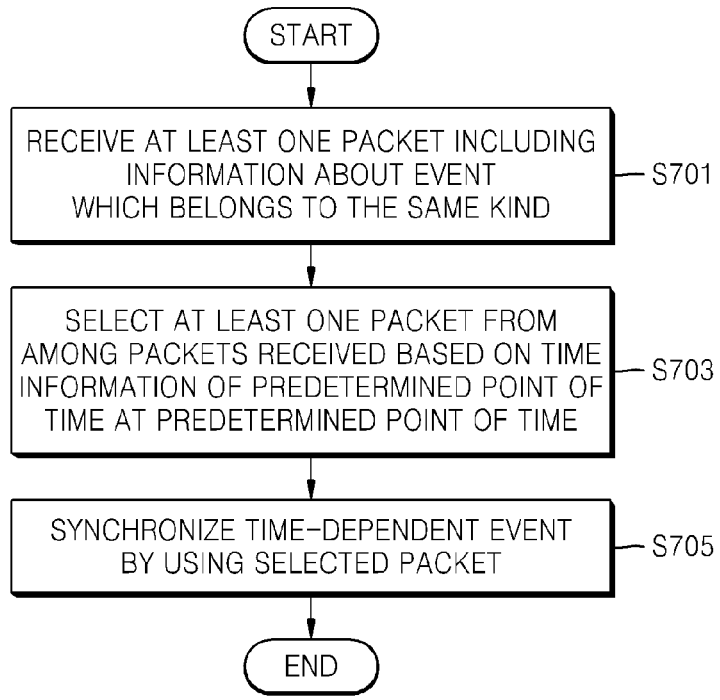

FIG. 7 is a flowchart illustrating a method of receiving a packet in a receiving terminal according to an embodiment of the present disclosure. The method of FIG. 7 may further include the operation of synchronizing the event when compared with the method illustrated in FIG. 6.

Referring to FIG. 7, operations S701 and 703 correspond to operations S601 and S603 of FIG. 6, and overlapping descriptions will be omitted here.

In operation S701, the receiving terminal 300 may receive at least one packet including information about the event which belongs to the same kind of event. The packet, which may be received in the receiving terminal 300, may include data of the minimum size from among the transmission units in which the packet may be transmitted through a network.

In operation S703, the receiving terminal 300 may select at least one packet from among packets received in operation S701 based on the time information of a certain point of time at the certain point of time. According to an embodiment of the present disclosure, the receiving terminal 300 may select a packet which is recently received based on a certain point of time or a packet which includes information about a recently occurred event.

In operation S705, the receiving terminal 300 may synchronize a time-dependent event by using a packet selected in operation S703. In an embodiment of the present disclosure, if the event, which may be synchronized in the receiving terminal 300, is dependent on time, synchronization may be performed using a recently occurred event when synchronizing the event. Hence, the receiving terminal 300 may synchronize the event by using a packet which is recently received based on the point of time of event synchronization or a packet including information about a recently occurred event.

Figure 8:
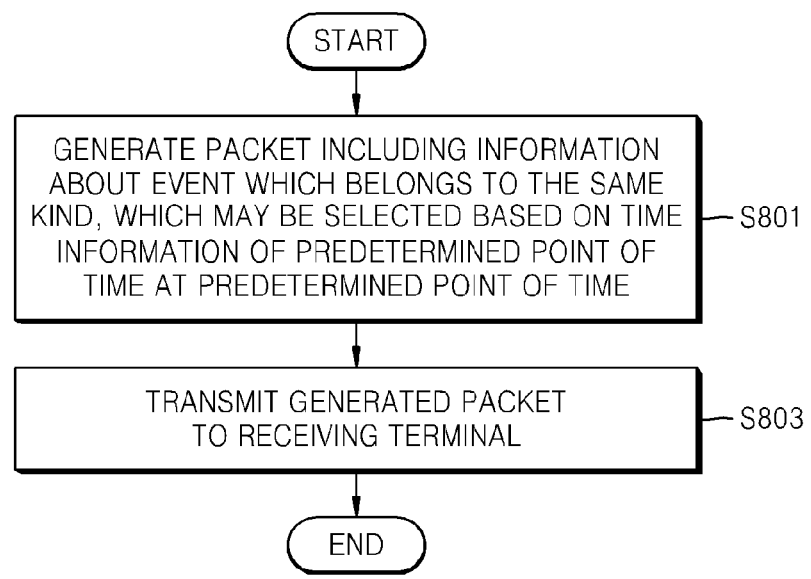
FIGS. 8 and 9 are flowcharts illustrating a method of transmitting a packet in a transmitting terminal according to an embodiment of the present disclosure.

FIG. 8 is a flowchart illustrating a method of transmitting a packet in a transmitting terminal according to an embodiment of the present disclosure.

Referring to FIG. 8, in operation S801, the transmitting terminal 200 may generate a packet including information about the event which belongs to the same kind of event. The packet, which may be generated at this time, may be selected by the receiving terminal 300 based on the time information of a certain point of time at the certain point of time.

In operation S803, the transmitting terminal 200 may transmit at least one packet generated in operation S801 to the receiving terminal 300. Each packet may be transmitted to the receiving terminal 300 in the order of packet generation or in the order of occurrence of events included in the packet.

In addition, each packet may be generated after a certain time at the point of time when an event temporarily occurs due to the error generated at the time of packet generation. At this time, when the real time attribute of the event, which is synchronized in the receiving terminal 300 is important, the packet, which is transmitted after a certain time at the time of event occurrence, may be unnecessary to maintain the real time attribute.

For example, when the movement event of the mouse pointer is synchronized in the receiving terminal 300, the mouse pointer in the receiving terminal 300 may be displayed at the same location as the current location of the mouse pointer in the transmitting terminal 200. Furthermore, the mouse pointer in the receiving terminal 300 may be displayed simultaneously with the input to the location moved according to the input received in the transmitting terminal 200. Hence, the location information of the mouse pointer at the previous point of time, which is different from the current point of time by more than a certain time, may correspond to information which is unnecessary when the receiving terminal 300 at the current point of time synchronizes the location of the mouse pointer with the location of the mouse pointer of the transmitting terminal 200 or the location of the mouse pointer which is input in the transmitting terminal 200. This is because the real time attribute for displaying the location of the mouse pointer may not be guaranteed. Hence, when the packet is generated after a certain time or the packet generation time exceeds a certain amount of time, the transmitting terminal 200 may stop the generation or transmission of the packet at the point of time when a certain time has been exceeded. At this time, the certain time may be set based on the average packet generation time in the transmitting terminal 200.

Figure 9:
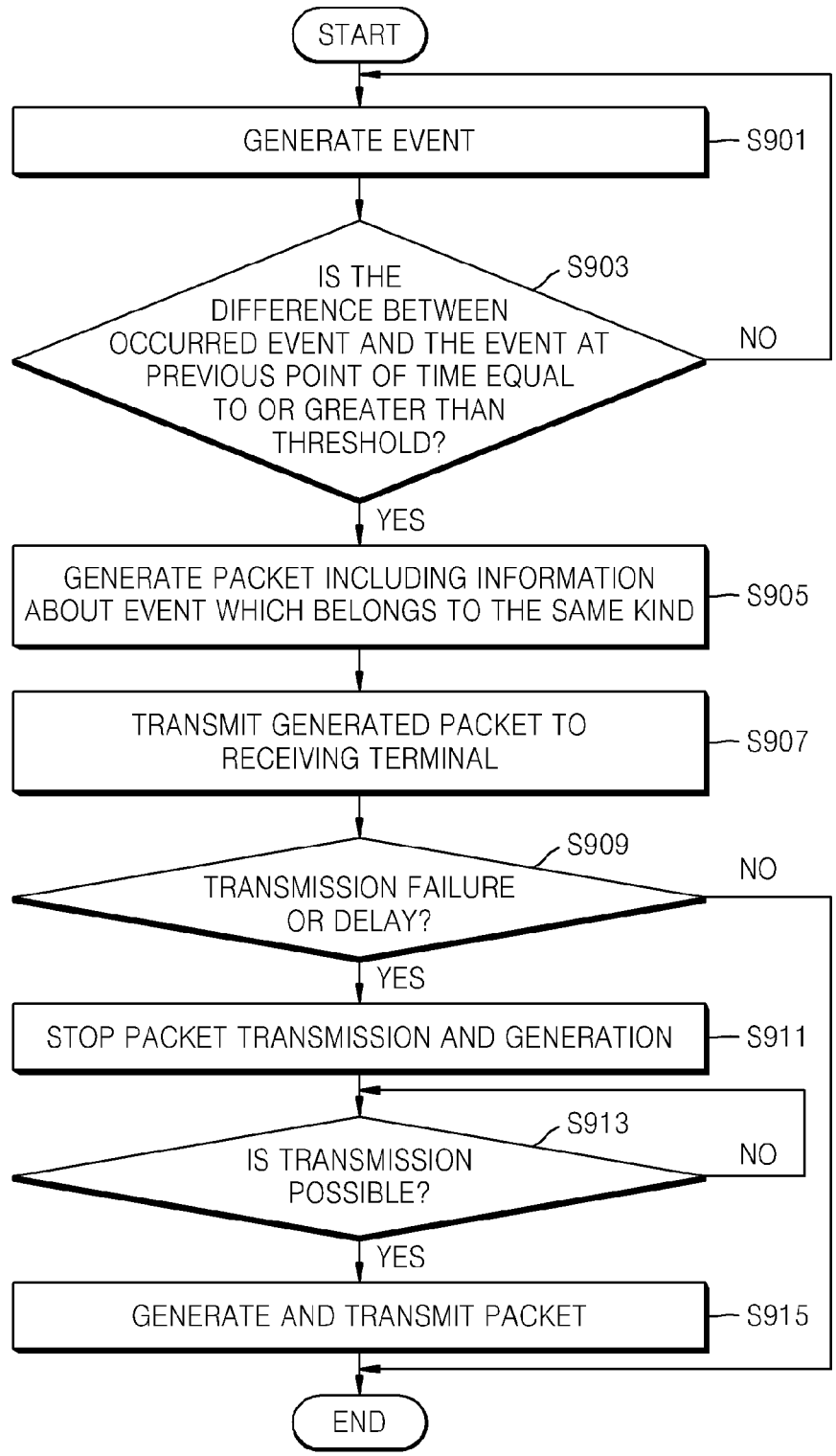

FIG. 9 is a flowchart illustrating a method of transmitting a packet in a transmitting terminal according to an embodiment of the present disclosure. When compared with the packet transmission method illustrated in FIG. 8, the packet transmission method illustrated in FIG. 9 may further include operations S901 to S903 and operations S909 to S915. Operation S905 and operation S907 of FIG. 9 correspond to operation S601 and operation S603 of FIG. 8, and overlapping descriptions will be omitted here.

Referring to FIG. 9, in operation S901, an event may occur in the transmitting terminal 200. In an embodiment of the present disclosure, an event, which may occur, may be dependent on time, and the status of the event, which occurs according to each point of time, may be different. For example, when the event is a movement event of the mouse pointer, the location information of the mouse pointer may have different values according to the point of time, except when no movement occurs.

In operation S903, the transmitting terminal 200 may determine whether the difference between the event that occurred in operation S901 and the event that occurred at the previous point of time is equal to or greater than a threshold. At this time, the event at the previous point of time may refer to an event included in the previously generated packet or an event generated at a certain point of time.

In an embodiment of the present embodiment, it may be determined whether the difference between the event, which is to be made as a packet and to be transmitted to the receiving terminal 300, and the event at the previous point of time, is equal to or greater than the threshold in order to prevent unnecessary data transmission.

For example, when the event is a mouse pointer movement event, the difference between the location of the mouse pointer at the point of time of packet generation and the location of the mouse pointer which is included in the previously generated packet may be none or so small that the difference may not be easily distinguished by the naked eye. At this time, an example of a case where the difference is none or so small that the difference may not be easily distinguished by the naked eye is a case where the movement of the mouse pointer is stopped for a certain amount of time or a movement occurs due to minute trembling. For example, when a movement occurs due to minute trembling, synchronizing the movement of the mouse pointer in the receiving terminal 300 may cause the user inconvenience. At this time, the location information of the mouse pointer may not be transmitted to the receiving terminal 300, and the packet at the previous point of time may be used in the event synchronization at the receiving terminal 300.

Hence, when the difference of the mouse pointer location is equal to or greater than the threshold, the transmitting terminal 200 may generate a packet including information about the event. The threshold may be determined by various factors, such as the resolution of the screen or the network environment information, and may have, for example, a value of 5 pixels.

In operation S905, the packet including information about the event which belongs to the same kind of event may be generated. The packet, which may be generated at this time, may be selected by the receiving terminal 300 based on the time information of a certain point of time at the certain point of time.

In operation S907, the transmitting terminal 200 may transmit at least one packet generated in operation S905 to the receiving terminal 300.

In operation S909, the transmitting terminal 200 may detect that the transmission fails or is delayed for a certain amount of time while the packet generated in operation S905 is transmitted to the receiving terminal 300 in operation S907.

The real time attribute, which is synchronized in the receiving terminal 300, is important, the packet, which is received in the receiving terminal 300 after a certain amount of time from the point of time when the event occurs, may be unnecessary to maintain the real time attribute of the event.

For example, when the movement event of the mouse pointer is synchronized in the receiving terminal 300, the mouse pointer in the receiving terminal 300 may be displayed at the same location as the current location of the mouse pointer in the transmitting terminal 200. Furthermore, the mouse pointer 300 may be displayed simultaneously with the input at the moved location according to the input received in the transmitting terminal 200. Furthermore, the time difference at the point of time when the location of the mouse pointer in the receiving terminal 300 is displayed at the same location as that of the mouse pointer of the transmitting terminal 200 may have such a small value that the user may be unable to detect. Furthermore, the time difference at the point of time when the location of the mouse pointer in the receiving terminal 300 is displayed at the same location as that of the mouse pointer which is moved according to an input in the transmitting terminal 200, may not have such a small value that the user may be unable to detect. For example, the location information of the mouse pointer at the previous point of time, which is different from the current point of time by more than a certain amount of time, or the location information of the mouse pointer, which is input to the transmitting terminal 200, may be information which is unnecessary in synchronizing the location of the mouse pointer with that of the transmitting terminal 200. Hence, when the packet transmission fails or is delayed, the packet generation and transmission may stop until the packet transmission becomes possible.

In operation S911, the transmitting terminal 200 may stop packet generation and transmission until the packet transmission becomes possible. When the packet generation and transmission stops, the receiving terminal 300 may not perform event synchronization for a certain amount of time, and after the amount of time passes, the receiving terminal 300 may display an alarm which indicates that the synchronization has stopped due to the packet transmission failure.

In operation S913, when the network transmission speed is higher than a threshold, the transmitting terminal 200 may detect that the packet transmission is possible. When the transmission speed of the network has a value higher than a certain transmission speed, the transmitting terminal 200 may secure the real time attribute of the synchronized event by performing packet transmission.

In operation S915, the transmitting terminal 200 may re-perform the packet generation and transmission. The event, which is included in the generated and transmitted packet, may be an event which is generated at the point of time when the packet has been generated.

Furthermore, in operation S909, while the packet, which is generated in operation S905, is transmitted to the receiving terminal 300, if the transmission failure or the transmission delay of more than a certain amount of time is not detected, operations S905 to S907 may be repeatedly performed.

Figure 10:
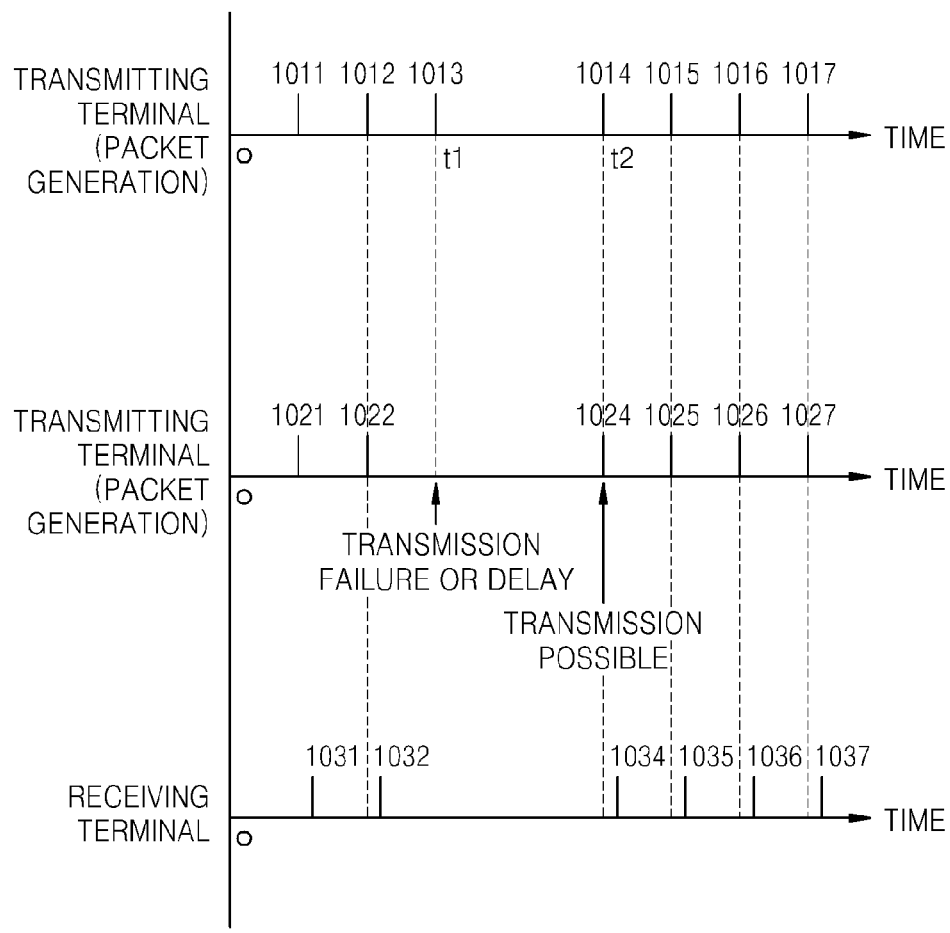
FIG. 10 is a time table illustrating a method of transmitting a packet according to an embodiment of the present disclosure.

FIG. 10 is a time table illustrating a method transmitting a packet according to an embodiment of the present disclosure.

Referring to FIG. 10, the time table, which illustrates an example of a packet transmission method according to an embodiment of the present embodiment, may include a time table which displays a point of time when the packet is generated in the transmitting terminal, the point of time when the packet is transmitted, and the point of time when the packet is received in the receiving terminal 300.

The packets 1011 to 1017, which are generated in the transmitting terminal 200, may correspond to the packets 1021 to 1027 transmitted in the transmitting terminal 200 and the packets 1031 to 1037 received in the receiving terminal 30, respectively.

The transmitting terminal 200 may generate a packet including information about the event that occurred according to a flow of time in the transmitting terminal, and may transmit the generated packet to the receiving terminal 300. Each packet may be transmitted to the receiving terminal 300 right after being generated so that the event may be synchronized in the receiving terminal 300.

At the point of time t1, if the packet transmission speed becomes lower than a threshold or the packet transmission failure or delay is detected, the transmitting terminal 200 may stop packet generation or transmission until the packet may become transmittable at a transmission speed higher than the threshold.

Furthermore, when the transmitting terminal 200 detects that the packet may be transmitted at a transmission speed higher than the threshold at t2, the transmitting terminal 200 may generate the packet and transmit the generated packet to the receiving terminal 300 at the point of time after t2.

The transmitting terminal 20 may not generate a packet for the event which occurs in a section between t1 and t2. When the real time attribute for the synchronized event is important, if the packet including information about the event is transmitted to the receiving terminal 300 after a certain amount of time from the event occurrence, the information about the event of the transmitted packet may become unnecessary at the current point of time. Hence, in an embodiment of the present disclosure, the transmitting terminal 200 may generate a packet including information about the event which occurs after t2, and may transmit the packet to the receiving terminal 300 at the point of time when the packet is generated.

Figure 11:
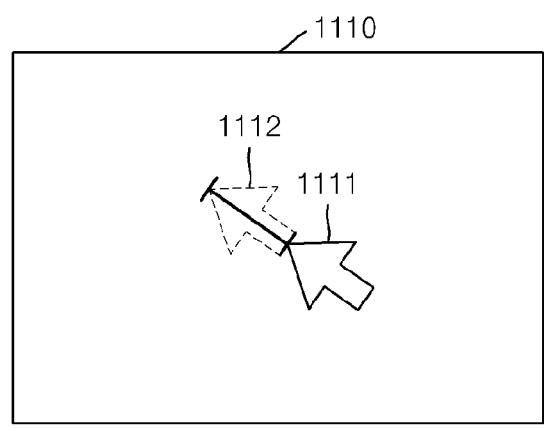
FIG. 11 illustrates a method of transmitting a packet according to an embodiment of the present disclosure.

FIG. 11 illustrates a method of transmitting a packet according to an embodiment of the present disclosure.

Referring to FIG. 11, when the event, which occurs in the transmitting terminal 200, is a movement event of a mouse pointer, a method of determining whether the occurred event is different from the event, which has occurred at the previous point of time, by more than a threshold, is illustrated. When the occurred event is different by more than the threshold, the transmitting terminal 200 may generate a packet including information about the event and transmit the generated packet to the receiving terminal 300.

When the mouse pointer is displayed on the screen 1110 of the transmitting terminal 200 or the receiving terminal 300, the transmitting terminal 200 may make information about a location 1111 of the mouse pointer at the current point of time and the location 1111 of the mouse pointer which is input at the current point of time as packets so as to determine whether to transmit the packet to the receiving terminal 300. More specifically, the transmitting terminal 200 may obtain the difference between the information about a location 1112 of the mouse pointer at the previous point of time and the information about the location 1111 of the mouse pointer at the current point of time. At this time, the transmitting terminal may obtain the difference by detecting the end of each mouse pointer and calculating the value that is obtained by measuring the straight distance between ends of respective mouse pointers.

Furthermore, when the obtained difference is greater than a certain threshold, the transmitting terminal 200 may form the information about the location 1111 of the mouse pointer at the current point of time as a packet and transmit the packet to the receiving terminal 300. Furthermore, when the obtained difference is smaller than the certain threshold, the transmitting terminal 200 may stand by until the next packet generation point of time without forming information about the location 1111 of the mouse pointer at the current point of time as a packet.

Hence, according to an embodiment of the present disclosure, when the occurred event is different by more than the threshold, the transmitting terminal 200 may generate and transmit a packet including information about the event, thereby minimizing wasting of resources.

FIG. 12 is a flowchart illustrating a method of transmitting or receiving a packet according to an embodiment of the present disclosure. Operations S1201 to S1217 of FIG. 12 correspond to operations S901 to S915 of FIG. 9, and overlapping descriptions will be omitted here. Furthermore, operations S1219 to S1221 of FIG. 12 correspond to operations S703 and S705 of S1221, and overlapping descriptions will be omitted here.

Referring to FIG. 12, in operation S1201, an event may occur in the transmitting terminal 200. In an embodiment of the present disclosure, the event may depend on time.

In operation S1203, the transmitting terminal 200 may determine whether the event, which occurs in operation S1201, is different from the event at the previous point of time by more than a threshold. At this time, the event at the previous point of time may refer to an event which is included in the previous generated packet or an event which has occurred at the certain point of time. In an embodiment of the present disclosure, in order to prevent unnecessary data transmission, it may be determined whether the event, which is to be formed as a packet and to be transmitted to the receiving terminal 300, is different from the event at the previous point of time by more than the threshold.

In operation S1205, the transmitting terminal 200 may generate a packet including information about the event which belongs to the same kind of event. The packet, which may be generated at this time, may be selected by the receiving terminal 300 based on time information of a certain point of time at the certain point of time.

In operation S1207, the transmitting terminal 200 may transmit at least one packet generated in operation S1205 to the receiving terminal 300.

In operation S1209, the transmitting terminal 200 may detect that the transmission fails or is delayed for more than a certain amount of time while the packet generated in operation S1205 is transmitted to the receiving terminal 300 in operation S1207.

In operation S1211, the transmitting terminal 200 may stop the packet generation and transmission until the packet transmission becomes possible as described above. When the packet generation and transmission is stopped, the receiving terminal 300 may not perform the event synchronization for a certain amount of time, and when the certain amount of time passes, the receiving terminal 300 may display an alarm indicating that the synchronization is stopped due to the packet transmission failure on the display.

In operation S1213, when the network transmission speed is equal to or greater than a certain speed, the transmitting terminal 200 may detect that the packet transmission is possible. When the transmission speed of the network is equal to or greater than a certain value, the transmitting terminal 200 may secure the real time attribute of the synchronized event by performing packet transmission.

In operation S1215, the transmitting terminal 200 may generate a packet, and in operation S1217, the transmitting terminal 200 may transmit the generated packet in operation S1215. At this time, the event included in the generated and transmitted packet may be an event which occurs at the point of time when the packet is generated.

In operation S1219, the receiving terminal 300 may determine whether the current point of time is a certain point of time. When it is determined that the current point of time is a certain point of time, in operation S1221, the receiving terminal 300 may select at least one packet from among packets received from the transmitting terminal 200 in operation S1217 based on time information of a certain point of time at the certain point of time. According to an embodiment of the present disclosure, the receiving terminal 300 may select a packet which is recently received based on a certain point of time or a packet including information about a recently occurred event. The receiving terminal 300 may synchronize an event which is dependent on the time using the packet selected in operation S1221.

According to an embodiment of the present disclosure, when a packet including information about the event, which repeatedly occurs in the transmitting terminal, is received in the transmitting terminal, even if the network environment is temporarily unstable, the receiving terminal may effectively display the synchronized displayed event while maintaining the real time attribute.

According to an embodiment of the present disclosure, the use of unnecessary network resources may be reduced by determining whether the difference between an event, which repeatedly occurs in the transmitting terminal, and the event which has occurred at the previous point of time, is equal to or greater than a threshold.

The packet transmission method or packet reception method according to an embodiment of the present disclosure may be implemented as a code which is readable by a computer (including any device having an information processing function) in a computer-readable recording medium. The computer-readable recording medium may include all kinds of recording devices where data, which is readable by a computer system, is stored. Some examples of the computer-readable recording medium are a ROM, a RAM, a CD-ROM, a magnetic tape, a floppy disk drive, and an optical data storage device.

As described above, according to the one or more of the above various embodiments of the present disclosure, when a packet including information about an event, which is repeatedly generated in the transmitting terminal, is received, even when the network environment is temporarily unstable, the receiving terminal may effectively display the event which is synchronized in real time.

Furthermore, according to one or more of the above various embodiments of the present disclosure, the use of unnecessary network resources may be reduced by determining whether the difference between the event, which is repeatedly generated in the transmitting terminal, and the event, which has occurred at the previous point of time, is equal to or greater than the threshold.

It should be understood that the various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving a packet by a receiving terminal, the method comprising:
controlling a transceiver for receiving a plurality of packets, during a predetermined time interval from a transmitting terminal, the plurality of packets including information about occurrences of a time dependent event; and
instructing at least one processor for:
selecting, from the plurality of packets and after expiration of the predetermined time interval, at least one packet including information about a most recent occurrence of the time dependent event from among the occurrences of the time dependent event that the received plurality of packets include information on,
synchronizing the event at the receiving terminal using the selected at least one packet, and
based on a packet transmission failure or delay, providing an alarm indicating that synchronization is not being performed,
wherein transmitting of a packet is stopped by the transmitting terminal after a time at which the time dependent event is generated, the packet comprising information about occurrences of the time dependent event,
wherein transmitting of the plurality of packets is stopped by the transmitting terminal if it is detected that the transmission of the plurality of packets fails or is delayed for more than a certain amount of time, and
wherein a packet corresponding to the current point of time is transmitted to the receiving terminal if it is detected that the transmission of the packet is possible.

2. A method of transmitting a packet by a transmitting terminal, the method comprising:
instructing at least one processor for generating a plurality of packets including information for synchronizing, at a receiving terminal, occurrences of a time dependent event; and
controlling a transceiver for transmitting the generated plurality of packets to the receiving terminal,
wherein at least one packet including information about a most recent occurrence of the time dependent event from among the occurrences of the time dependent event that the plurality of packets include information on is selected at the receiving terminal,
wherein transmitting of a packet is stopped by the transmitting terminal after a time at which the time dependent event is generated, the packet comprising information about occurrences of the time dependent event,
wherein transmitting of the plurality of packets is stopped by the transmitting terminal if it is detected that the transmission of the plurality of packets fails or is delayed for more than a certain amount of time,
wherein a packet corresponding to the current point of time is transmitted to the receiving terminal if it is detected that the transmission of the packet is possible, and
wherein, based on the packet transmission failure or delay, an alarm is provided indicating that synchronization is not being performed.

3. The method of claim 2, wherein the generating of the plurality of packets comprises:
determining whether there is a difference between information about the event at a first point of time and information about the event at a second point of time; and
generating one or more packets including information about the event at the first point of time according to a result of the determination.

4. A receiving terminal comprising:
a transceiver configured to receive a plurality of packets during a predetermined time interval from a transmitting terminal, the plurality of packets including information about occurrences of a time dependent event; and
at least one processor configured to:
select, from the plurality of packets and after the expiration of the predetermined time interval, at least one packet including information about a most recent occurrence of the time dependent event from among the occurrences of the time dependent event that the received plurality of packets include information on,
synchronize the event at the receiving terminal using the selected at least one packet, and
based on the packet transmission failure or delay, provide an alarm indicating that synchronization is not being performed,
wherein transmitting of a packet is stopped by the transmitting terminal after a time at which the time dependent event is generated, the packet comprising information about occurrences of the time dependent event,
wherein transmitting of the plurality of packets is stopped by the transmitting terminal if it is detected that the transmission of the plurality of packets fails or is delayed for more than a certain amount of time, and wherein a packet corresponding to the current point of time is transmitted to the receiving terminal if it is detected that the transmission of the packet is possible.

5. A transmitting terminal comprising:

at least one processor configured to generate a plurality of packets including information for synchronizing, at a receiving terminal, occurrences of a time dependent event; and a transceiver configured to transmit the generated plurality of packets to the receiving terminal, wherein at least one packet including information about a most recent occurrence of the time dependent event from among the occurrences of the time dependent event that the plurality of packets include information on is selected at the receiving terminal, wherein transmitting of a packet is stopped by the transmitting terminal after a time at which the time dependent event is generated, the packet comprising information about occurrences of the time dependent event, wherein transmitting of the plurality of packets is stopped by the transmitting terminal if it is detected that the transmission of the plurality of packets fails or is delayed for more than a certain amount of time, wherein a packet corresponding to the current point of time is transmitted to the receiving terminal if it is detected that the transmission of the packet is possible, and wherein, based on the packet transmission failure or delay, an alarm is provided indicating that synchronization is not being performed.

6. The transmitting terminal of claim 5, wherein the at least one processor is further configured to:

determine whether a difference between information about the event at a first point of time and information about the event at a second point of time is equal to or greater than a threshold, and generate one or more packets including information about the event at the first point of time according to a result of the determination.

7. A system comprising:

a transmitting terminal configured to:

generate a plurality of packets including information for synchronizing, at a receiving terminal, occurrences of a time dependent event, and transmit the generated plurality of packets to the receiving terminal; and a receiving terminal configured to:

receive the generated plurality of packets from the transmitting terminal during a predetermined interval, select, from the plurality of packets and after the expiration of the predetermined time interval, one or more packets including information about a most recent occurrence of the time dependent event from among the occurrences of the time dependent event that the received plurality of packets include information on, synchronize the event at the receiving terminal using the selected one or more packets, and based on the packet transmission failure or delay, provide an alarm indicating that synchronization is not being performed, wherein transmitting of a packet is stopped by the transmitting terminal after a time at which the time dependent event is generated, the packet comprising information about occurrences of the time dependent event, wherein transmitting of the plurality of packets is stopped by the transmitting terminal if it is detected that the transmission of the plurality of packets fails or is delayed for more than a certain amount of time, and wherein a packet corresponding to the current point of time is transmitted to the receiving terminal if it is detected that the transmission of the packet is possible.

8. The system of claim 7, wherein the transmitting terminal is further configured to:

determine whether a difference between information about the event at a first point of time and information about the event at a second point of time is equal to or greater than a threshold, and generate one or more packets including information about the event at the first point of time according to a result of the determination.

* * * * *